US009295228B1

(12) United States Patent
Schiermeier

(10) Patent No.: US 9,295,228 B1
(45) Date of Patent: Mar. 29, 2016

(54) TUBE ATTACHABLE TOOTHBRUSH FOR PETS

(71) Applicant: Roger J. Schiermeier, St Louis, MO (US)

(72) Inventor: Roger J. Schiermeier, St Louis, MO (US)

( * ) Notice: Subject to any disclaimer, the term of this patent is extended or adjusted under 35 U.S.C. 154(b) by 89 days.

(21) Appl. No.: 14/252,601

(22) Filed: Apr. 14, 2014

Related U.S. Application Data

(60) Provisional application No. 61/860,569, filed on Jul. 31, 2013.

(51) Int. Cl.
*A46B 17/04* (2006.01)
*A01K 13/00* (2006.01)
*A46B 11/00* (2006.01)

(52) U.S. Cl.
CPC ............ *A01K 13/001* (2013.01); *A46B 11/0065* (2013.01); *A46B 2200/1086* (2013.01)

(58) Field of Classification Search
CPC ..................... A46B 2200/1086; A46B 11/06
USPC .................................. 401/183, 184, 270, 271
See application file for complete search history.

(56) References Cited

U.S. PATENT DOCUMENTS

| | | | | |
|---|---|---|---|---|
| 1,859,402 A * | 5/1932 | Maher | ................. | A46B 11/0041 401/152 |
| 3,408,150 A * | 10/1968 | Figa | ................... | A46B 11/0041 132/311 |
| 4,109,339 A * | 8/1978 | Dietrich | ................... | A46B 5/02 15/143.1 |
| 4,582,075 A * | 4/1986 | O'Neal | ............... | A46B 11/0041 132/308 |
| 5,908,257 A | 6/1999 | Martin | | |
| 6,334,451 B1 | 1/2002 | Yang | | |
| 6,536,979 B1 * | 3/2003 | Kenny | ............... | A46B 11/0041 401/183 |
| 6,685,375 B1 | 2/2004 | Crocker | | |
| 6,729,789 B2 | 5/2004 | Gordon | | |
| 6,749,087 B1 * | 6/2004 | Robinson | ................ | B65F 35/28 222/1 |
| 7,128,492 B1 * | 10/2006 | Thames, Jr. | .......... | A46B 11/002 401/270 |
| 7,237,974 B2 * | 7/2007 | Pfenniger | .......... | A46B 15/0061 401/118 |
| 8,091,170 B2 * | 1/2012 | Moskovich | .......... | A46B 5/0062 15/110 |
| 2008/0219751 A1 | 9/2008 | Teitelbaum | | |

* cited by examiner

*Primary Examiner* — Jennifer C Chiang
(74) *Attorney, Agent, or Firm* — Williams Intellectual Property; Benjamin F. Williams

(57) ABSTRACT

A tube attachable toothbrush for pets includes an elongate member having a distally disposed head member and a proximal end attachable to a tube of toothpaste. The head member includes an anterior face obliquely disposed relative the elongate member, and a posterior side disposed in a congruent plane with the head member. A clip member, transversely attachable to the tube of toothpaste, is positional to prevent forcing of toothpaste back to spent portions of the tube. An interior channel, disposed between the proximal end and an aperture disposed in the anterior face of the head member, enables fluid communication of toothpaste from the tube to a plurality of bristles disposed upon the anterior face, whereby toothpaste is continuously applicable to a pet's teeth and a user's hand wielding the elongate member is positioned away from the pet's mouth during the act of brushing.

5 Claims, 3 Drawing Sheets

TUBE ATTACHABLE TOOTHBRUSH FOR PETS

CROSS-REFERENCE TO RELATED APPLICATIONS

Figure 1:
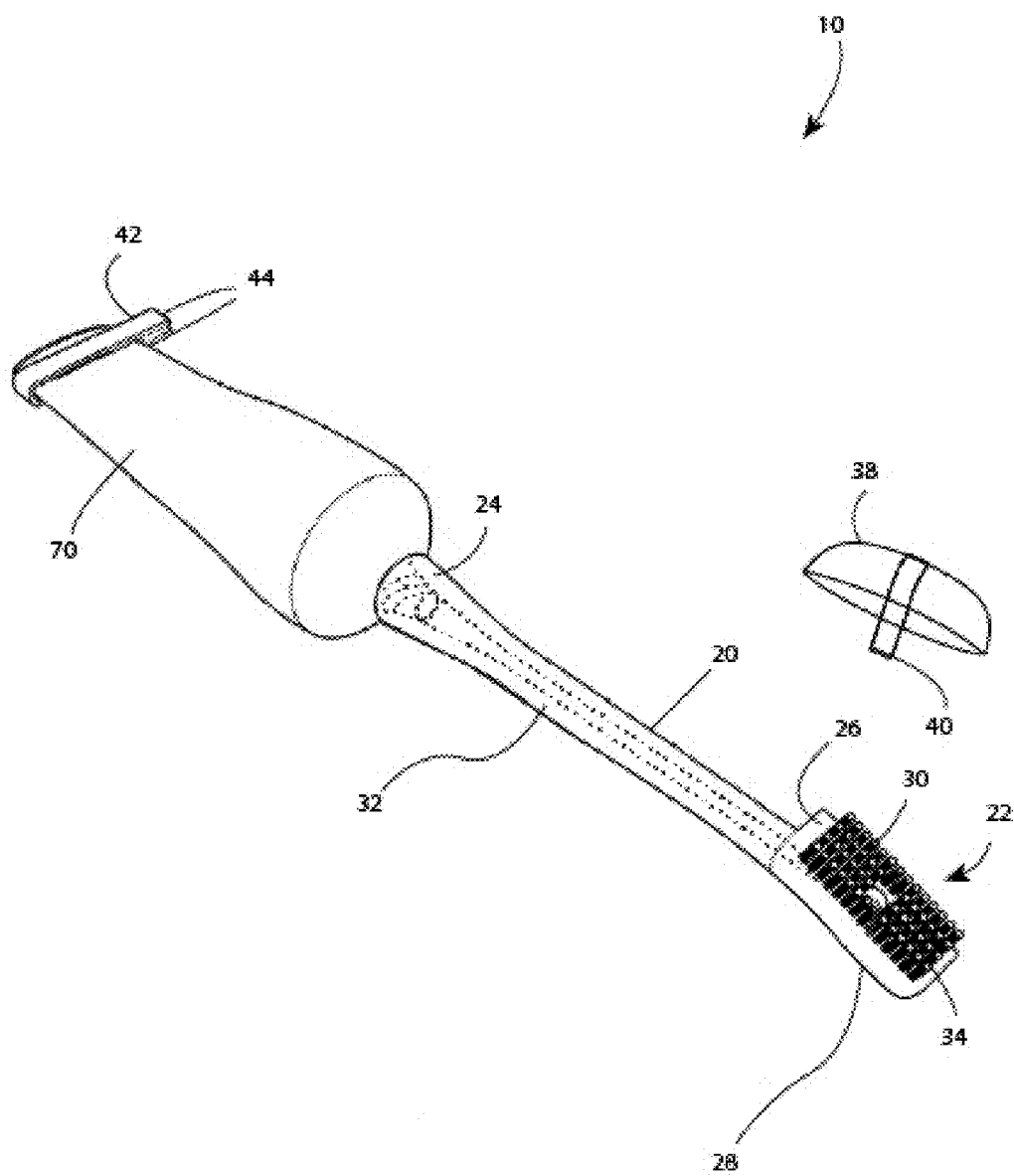

Provisional Application No. 61860569 filed on Jul. 31, 2013

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of tube attachable toothbrushes for pets are known in the prior art. However, what is needed is tube attachable toothbrush for pets that includes an anterior face angularly disposed upon a head member whereby a plurality of bristles, perpendicularly disposed upon said anterior face, is obliquely situated realtive an elongate member to prevent incidental contact of a user's hand with the pet's teeth during the act of brushing. A clip member is also included for transverse engagement across an extant tube of toothpaste to thereby delimit any spent portion of the extent tube of toothpaste, whereby toothpaste is preventable from forcing into said spent portion during the act of brushing. The present tube attachable toothbrush for pets also includes a depression disposed upon a posterior side of the head member for ergonomic engagement with a user's finger whereby pressure is applicable directly to the head member for engagement against the pet's teeth. A cap member is also included, attachable to the head portion, wherein the plurality of bristles is enclosable and an aperture disposed in head portion is sealable. Toothpaste residual within the device is therefore sealable therein, and the device is storable attached to an extant tube of toothpaste without the toothpaste desicating therein.

FIELD OF THE INVENTION

The present invention relates to a tube attachable toothbrush for pets, and more particularly, to a tube attachable toothbrush for pets that includes an elongate member having a distally disposed head member and a proximal end attachable to a tube of toothpaste. The head member includes an anterior face obliquely disposed relative the elongate member, and a posterior side disposed in a congruent plane with the head member. A clip member, transversely attachable to the tube of toothpaste, is positional to prevent forcing of toothpaste back to spent portions of the tube. An interior channel, disposed between the proximal end and an aperture disposed in the anterior face of the head member, enables fluid communication of toothpaste from the tube to a plurality of bristles disposed upon the anterior face, whereby toothpaste is continuously applicable to a pet's teeth and a user's hand wielding the elongate member is positioned away from the pet's mouth during the act of brushing.

SUMMARY OF THE INVENTION

The general purpose of the tube attachable toothbrush for pets, described subsequently in greater detail, is to provide tube attachable toothbrush for pets which has many novel features that result in tube attachable toothbrush for pets which is not anticipated, rendered obvious, suggested, or even implied by prior art, either alone or in combination thereof.

The present tube attachable toothbrush for pets has been devised to enable continuous application of toothpaste to a pet's teeth during the act of brushing, while maintaining a safe distance of a user's hands from contacting the teeth of said pet. Moreover, the present tube attachable toothbrush for pets includes a clip member attachable transversely across a tube of toothpaste to enable forcing of said toothpaste directionally within the tube. A depression is also included, recessed in a posterior side of a head member, whereby ergonomic contact of a user's finger is enabled to direct pressure to the head member, and a plurality of bristles thereat disposed, for engagement against a pet's teeth.

When brushing a pet's teeth, the animal often licks the toothpaste applied to the teeth away, thereby frustrating the act of brushing. Repeated application of toothpaste is often required, therefore, which often results in stopping and starting the activity of brushing. This can frustrate both the pet and owner, and negatively condition the pet against future acts of brushing.

The present tube attachable toothbrush for pets has been devised to attach directly to the nozzle of an extant tube of toothpaste, whereby toothpaste is forcible from the tube of toothpaste up an interior channel disposed within an elongate member, for exudation proximal a plurality of bristles, whereby continuous application of toothpaste to a pet's teeth during the act of brushing is enabled. Moreover, the present device includes a clip member, attachable transversely across said tube of toothpaste, whereby toothpaste in the tube is prevented from passage back to portions of the tube wherefrom toothpaste has already been forced. Thus, the clip member effects directional forcing of the toothpaste within the tube, said toothpaste forced directionally in the tube to be expelled through the nozzle of the extant tube of toothpaste for continuous application during the act of brushing, as will be subsequently described.

The present tube attachable toothbrush for pets, therefore, includes an elongate member having a distally disposed head member and a proximal end. The proximal end is conically flared and is sized appropriate for attachment to the nozzle of an extant tube of toothpaste. A thread is circumferentially disposed upon an interior of the proximal end, whereby said proximal end is rotationally attachable to the extant thread disposed upon a nozzle of a tube of toothpaste.

The distally disposed head member includes an anterior face, disposed obliquely relative the elongate member, and a posterior side, disposed in a congruent plane relative the elongate member. A plurality of bristles is perpendicularly disposed upon the anterior face of the head member, said plurality of bristles thereby disposed at an oblique angle relative the elongate member. A user grasping the device, therefore, positions the elongate member at an oblique angle relative the maw of the pet when actively brushing said pet's teeth. A user is therefore prevented from unintentional contact of said user's hand with the pet's teeth during the act of brushing.

In the preferred embodiment herein disclosed, each of the plurality of bristles is rendered from silicone, and thereby durable for repeated use of the device.

A depression is disposed on the posterior side of the head member, said depression ergonomically configured for application of pressure thereto by a user's finger. A user is thereby enabled to apply direct pressure to the head member, and directly engage the plurality of bristles in contact with a pet's teeth, as desired during the act of brushing.

The interior channel is disposed longitudinally interior to the elongate member, and is delimited between the proximal end and an aperture disposed upon the anterior face of the head member. When attached to an extant tube of toothpaste, toothpaste is forcible out the nozzle of the tube of toothpaste for fluid communication along the interior channel, whereby said toothpaste is exuded from the aperture proximal the plurality of bristles. Toothpaste is thus continuously applicable to the pet's teeth during the act of brushing.

To prevent toothpaste from being forced into spent portions of the tube of toothpaste, a clip member is included for transverse engagement across said tube of toothpaste. The clip member includes a pair of arms torsionally attached at a center. Each of the pair of arms is positional on either side of a tube of toothpaste, whereby passage of toothpaste between the arms of the clip member is obviated. A user is enabled, therefore, to position the clip member to delimit a spent portion of the tube of toothpaste and thereby prevent forcing of toothpaste into portions of the tube wherefrom said toothpaste has previously been forced. Toothpaste is thus directionally forcible through the tube toward the nozzle, for fluid communication to the plurality of bristles (and thus the pet's teeth) through the interior channel.

For storage of the tube attachable toothbrush for pets when not in use, a cap member is included. The cap member is attachable to the head member whereby the plurality of bristles are enclosable and contact with objects or the ambient environment is prevented. The cap member includes a projecting plug disposed to sealingly engage in the aperture disposed upon the anterior face of the head member, whereby toothpaste in the interior channel is sealed therein.

Thus has been broadly outlined the more important features of the present tube attachable toothbrush for pets so that the detailed description thereof that follows may be better understood and in order that the present contribution to the art may be better appreciated.

Objects of the present tube attachable toothbrush for pets, along with various novel features that characterize the invention are particularly pointed out in the claims forming a part of this disclosure. For better understanding of the tube attachable toothbrush for pets, its operating advantages and specific objects attained by its uses, refer to the accompanying drawings and description.

BRIEF DESCRIPTION OF THE DRAWINGS FIGURES

Figure 2:
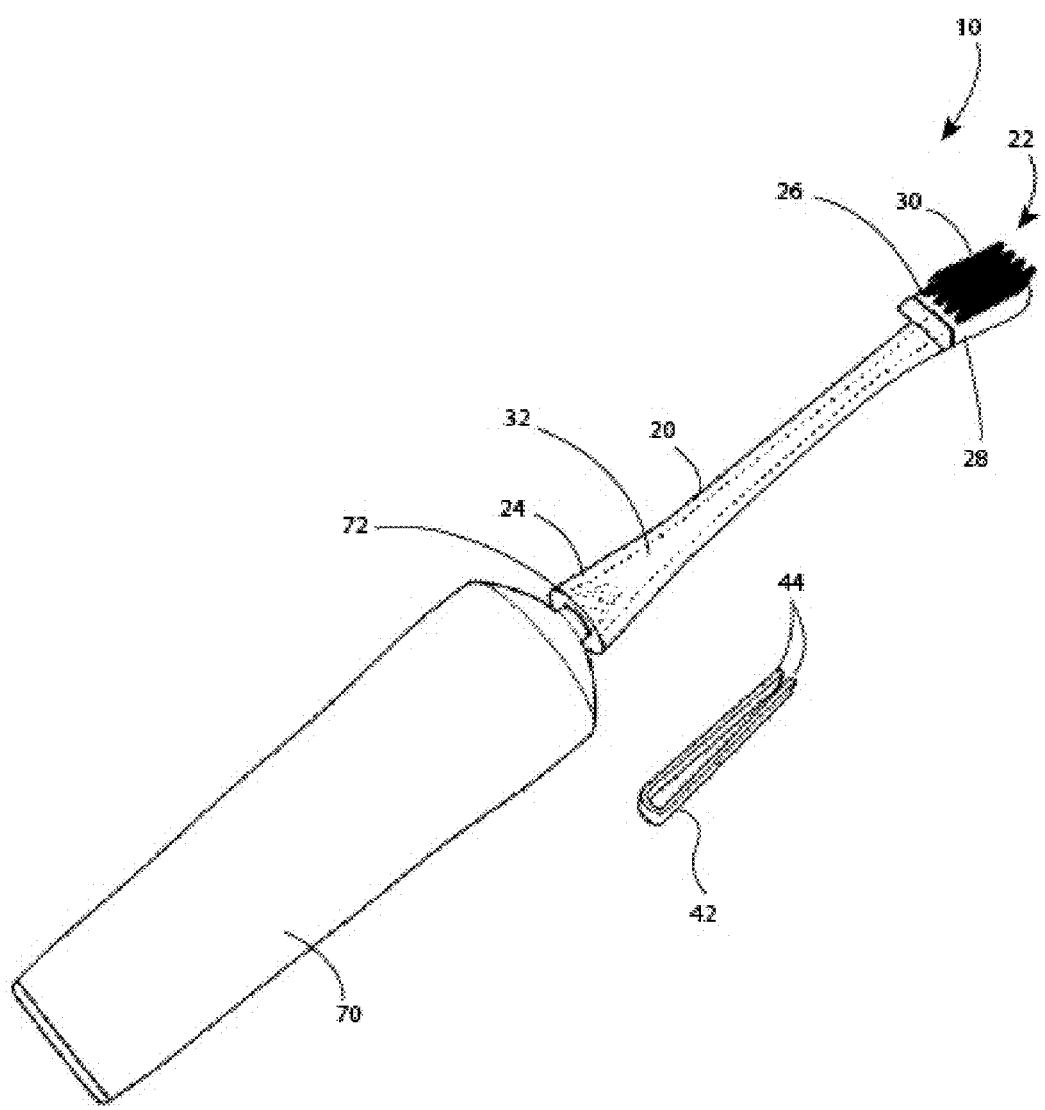
Figure 3:
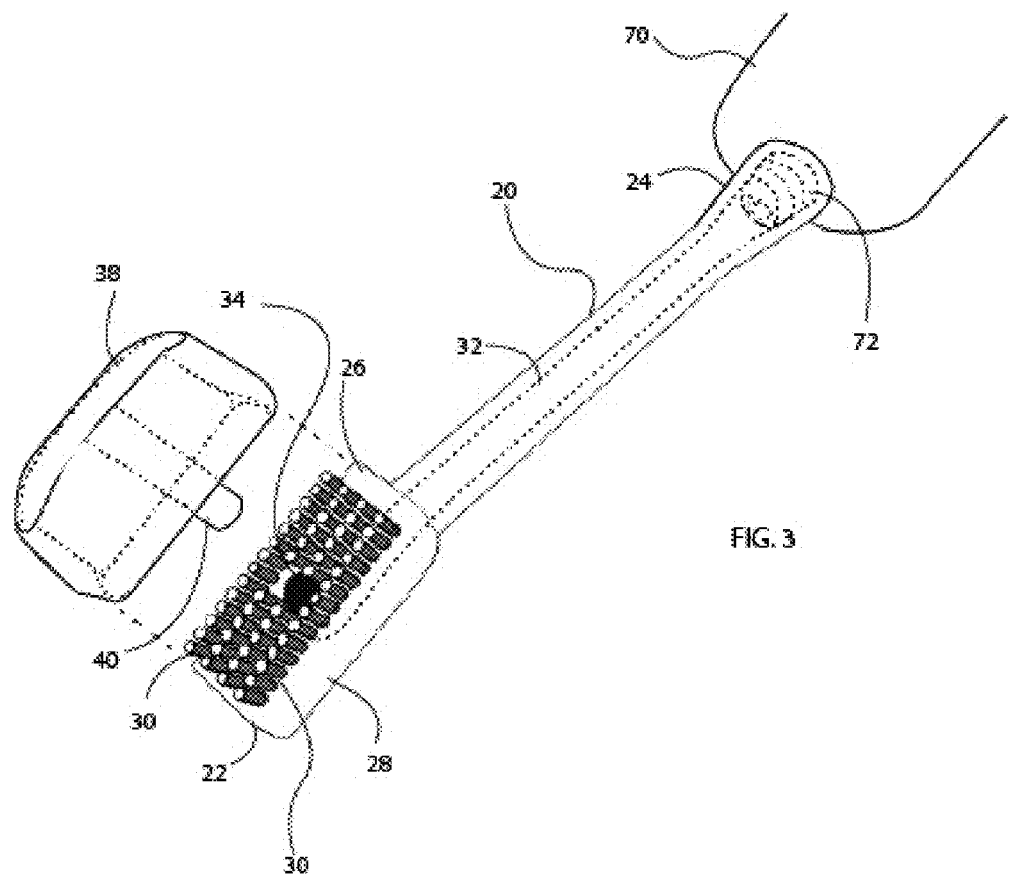
Figure 4:
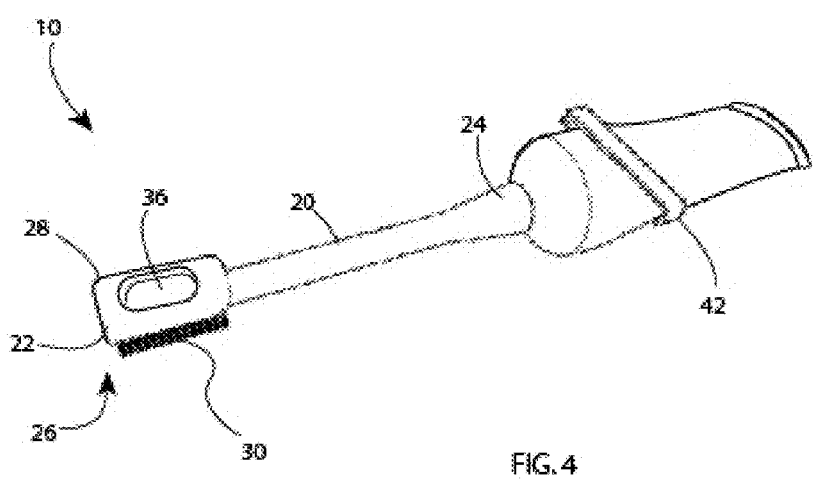

FIG. 1 is an isometric view.
FIG. 2 is am isometric view.
FIG. 3 is a detail view of an anterior face of a head member.
FIG. 4 is a detail view of a posterior side of the head member.

DETAILED DESCRIPTION OF THE DRAWINGS

With reference now to the drawings, and in particular FIGS. 1 through 4 thereof, example of the instant tube attachable toothbrush for pets employing the principles and concepts of the present tube attachable toothbrush for pets and generally designated by the reference number 10 will be described.

Referring to FIGS. 1 through 4 a preferred embodiment of the present tube attachable toothbrush for pets 10 is illustrated.

The present tube attachable toothbrush for pets 10 has been devised to exude toothpaste forced from an extant tube of toothpaste 70 to a pet's teeth during the act of brushing. The present tube attachable toothbrush for pets 10 includes a head member 22 having a depression 36 disposed on a posterior side 28 thereof, said depression 36 ergonomically configured for reception of a finger of a user therein, whereby the head member 22 is directly depressible against the teeth of a pet during the act of brushing.

The preset tube attachable toothbrush 10 for pets also includes a clip member 42 positional transversely across an extant tube of tooth paste 70, whereby toothpaste is forcible in said tube 70 for exudation from the head member 22 and said toothpaste is prevented from passage into spent portions of the tube of toothpaste 70. The clip member 42 includes a pair of arms 44 disposed in parallel and torsioned against a center. The clip member 42 is positional transversely across the tube 70, whereby the pair of arms 44 are disposed torsioned in parallel situation on either side of a tube of toothpaste 70. The clip member 42 therefore secures around a tube of toothpaste 70 and prevents forcing of the toothpaste between the pair of arms 44, whereby toothpaste is forcible in the tube 70 towards the nozzle only, and toothpaste is thereby forcible into the elongate member 20 for application upon a plurality of bristles 30, as will be described subsequently.

The tube attachable toothbrush for pets 10, therefore, includes an elongate member 20 having a distally disposed head member 22 and a proximal end 24. The head member 22 includes an anterior face 26 and a posterior side 28, said anterior face 26 disposed at an oblique angle relative the elongate member 20 and the posterior side 28 disposed in a congruent plane with the elongate member 20. A plurality of bristles 30 is perpendicularly disposed on the anterior face 26.

The plurality of bristles 30 is therefore disposed at an oblique angle relative the elongate member 20, whereby the elongate member 20 is positional at an oblique angle relative the mouth of a pet during the act of brushing said pet's teeth. The elongate member 20 is, therefore, dispositional during brushing so that a hand of the user grasping said elongate member is disposed at an angled distance from the mouth of the pet whereby incidental contact of the user's hand with the pet's teeth is preventable during the act of brushing.

The proximal end 24 is attachable to a nozzle 72 of an extant tube of toothpaste 70. The proximal end 24 is conically flared and includes a thread circumferentially disposed therein, said thread enabling rotational attachment of the elongate member 20 to the nozzle 72 of the extant tube of toothpaste 70.

An interior channel 32 is disposed longitudinally within the elongate member 20 between the proximal end 24 and an aperture 34 disposed in the anterior face 26 of the head member 22. The aperture 34 is disposed in proximity to the plurality of bristles 30. Toothpaste is thus forcible from the tube of toothpaste 70, and fluidly communicable through the interior channel 32 of the elongate member 20 for exudation upon the anterior face 26, whereby toothpaste is continually applicable to the plurality of bristles 30 during the act of brushing, and thereby producible for contact with the pet's teeth.

For application of direct pressure to engage the plurality of bristles 30 against the teeth of the pet during the act of brushing, a depression 36 is disposed upon the posterior side 28 of head member 22. The depression 36 is disposed thereat for ergonomic engagement with a finger of a user. A user, therefore, is enabled to apply pressure directly to the head member 22 against the teeth of the pet, and the depression 36 thereby provides purchase against which to apply said user's finger.

For storage of the present device 10 while attached to an extant tube of toothpaste 70, a cap member 38 is included, said cap member 38 attachable over the plurality of silicone bristles 30. The cap member 38 includes a projecting plug 40 devised to sealingly engage the aperture 34 disposed in the anterior face 26 of the head member 22 when the cap member 38 is applied to the head member 22.

Toothpaste is therefore forcible out of the aperture 34 onto the plurality of bristles 30 during the act of brushing a pet's teeth, the clip member 42 is positional to exert pressure transversely across the tube of toothpaste 70 to force toothpaste up the tube 70 and prevent toothpaste from being forced down the tube 70, and the depression 36 on the posterior side 28 of the head member 22 enables application of direct pressure against said pet's teeth during the act of brushing.

In the preferred embodiment herein disclosed, the plurality of bristles are made of silicone, and therefore durably rendered for repeated use, as desired.

What is claimed is:

1. A tube attachable toothbrush for pets comprising:
    an elongate member having
        a head member;
        a plurality of bristles disposed anteriorly upon a head member;
        a proximal end, attachable to a nozzle of an extant tube of toothpaste;
        a separate clip member attachable transversely to said extant tube of toothpaste to exert pressure thereon;
        a cap member attachable to the head member, said cap member including:
            a projecting plug fittable into an aperture disposed at the head member proximal the plurality of bristles, wherein attachment of the cap member to the head member seals the aperture and encloses the plurality of bristles; and
        a depression disposed posteriorly upon the head member accommodative of a finger positional within the depression of a user to direct the head member over the pet's teeth during the action of brushing;
        wherein an interior channel within the elongate member communicates toothpaste, when pressure is exerted upon the extant tube of toothpaste, to exude said toothpaste through the aperture whereby said toothpaste is applicable to the plurality of bristles for application upon a pet's teeth during the act of brushing said pet's teeth.

2. The tube attachable toothbrush for pets of claim 1 wherein the proximal end is conically flared and includes an thread interiorly disposed circumferentially therein for threadable engagement with a nozzle of an extant tube of toothpaste.

3. The tube attachable toothbrush for pets of claim 2 wherein the head member includes an anterior face and a posterior side, said anterior face angularly disposed relative the posterior side, whereby the plurality of bristles is disposed at an oblique angle relative the elongate member.

4. The tube attachable toothbrush for pets of claim 3 wherein each of the plurality of bristles is rendered in silicone.

5. A tube attachable toothbrush for pets comprising:
    an elongate member including:
        a distally disposed head member having an anterior face and a posterior side, said anterior face disposed at an oblique angle relative the elongate member, said posterior side disposed in a congruent plane with the elongate member;
        a proximal end attachable to a nozzle of an extant tube of toothpaste, said proximal end conically flared and having a thread circumferentially disposed therein, said thread enabling rotational attachment of the elongate member to the nozzle of the extant tube of toothpaste;
    a plurality of silicone bristles perpendicularly disposed upon the anterior face of the head member, said plurality of silicone bristles thereat obliquely situated relative the elongate member;
    an interior channel disposed longitudinally within the elongate member, said interior channel disposed between the proximal end and an aperture disposed in the anterior face of the head member, said aperture disposed in proximity to the plurality of silicone bristles;
    a clip member attachable transversely across a tube of toothpaste and positional thereupon to exert pressure transversely across the tube of toothpaste to force toothpaste up the tube;
    a depression disposed upon the posterior side of head member, said depression disposed for ergonomic engagement with a finger of a user; and
    a cap member attachable over the plurality of silicone bristles, said cap member having a projecting plug devised to sealingly engage the aperture when the cap member is applied to the head member;
    wherein toothpaste is forcible out of the aperture onto the plurality of silicone bristles during the act of brushing a pet's teeth, the clip member exerts pressure transversely across the tube of toothpaste to force toothpaste directionally within the tube, and the depression on the posterior side of the head member enables application of direct pressure against said pet's teeth during the act of brushing.

* * * * *